United States Patent [19]

Nagasaka et al.

[11] Patent Number: 4,636,093

[45] Date of Patent: Jan. 13, 1987

[54] METHOD OF MEASURING TEMPERATURES AND PORTABLE RECORDER FOR STORING TEMPERATURE DATA

[75] Inventors: Hiroyasu Nagasaka, Chiryu; Kunio Kamidaira, Nagoya; Hiroshi Ino; Mitsuo Utsuno, both of Aichi, all of Japan

[73] Assignee: Daido Tokushuko Kabushiki Kaisha, Nagoya, Japan

[21] Appl. No.: 761,884

[22] Filed: Aug. 2, 1985

[30] Foreign Application Priority Data

Sep. 4, 1984 [JP] Japan .................................. 59-186115
Sep. 18, 1984 [JP] Japan .......................... 59-141081[U]
Sep. 21, 1984 [JP] Japan .................................. 59-199086

[51] Int. Cl.[4] ........................ G01D 15/00; G01K 5/70
[52] U.S. Cl. ............................... 374/186; 346/33 TP; 364/557; 374/102; 374/124
[58] Field of Search ............... 374/170, 186, 110, 103, 374/124, 102; 364/557; 358/227; 346/33 TP

[56] References Cited

U.S. PATENT DOCUMENTS

| | | | |
|---|---|---|---|
| 2,635,514 | 4/1953 | Roe | 358/227 |
| 3,444,739 | 5/1969 | Treharne | 374/128 |
| 3,541,941 | 11/1970 | Barr et al. | 358/227 X |
| 3,941,923 | 3/1976 | Wheeler | 374/102 X |
| 4,343,182 | 8/1982 | Pompei | 374/124 X |
| 4,413,175 | 11/1983 | Schilling et al. | 374/103 |
| 4,420,265 | 12/1983 | Everest et al. | 374/124 X |
| 4,447,884 | 5/1984 | Wada | 374/170 X |
| 4,473,307 | 9/1984 | Dobronyi et al. | 364/557 X |
| 4,475,158 | 10/1984 | Elias | 364/557 X |
| 4,480,312 | 10/1984 | Wingate | 364/557 |
| 4,504,010 | 3/1985 | Sukimoto et al. | 374/102 X |
| 4,574,359 | 3/1986 | Ishizaka et al. | 364/557 F |

*Primary Examiner*—Daniel M. Yasich
*Attorney, Agent, or Firm*—Oblon, Fisher, Spivak, McClelland & Maier

[57] ABSTRACT

A portable temperature data recorder for temporarily storing plural sets of temperature data representative of temperatures at a single location or at different locations, and automatically transferring the stored temperature data to a data processing unit. The portable recorder has a connector for connection thereof to the data processing unit. The portable recorder may further have a connector for connection thereof to a stationary temperature detector or thermometer installed at each measurement location. Alternatively, the temperature recorder incorporate a temperature detector for measuring the temperatures at the measurement locations. A clock circuit may be provided in the portable recorder, so that the temperature data may be stored together with measurement time data. The temperature detector may be a radiation thermometer provided at the measurement location, or built in the portable recorder.

2 Claims, 13 Drawing Figures

TEMPERATURE
MEASUREMENT
COMMAND SIGNAL

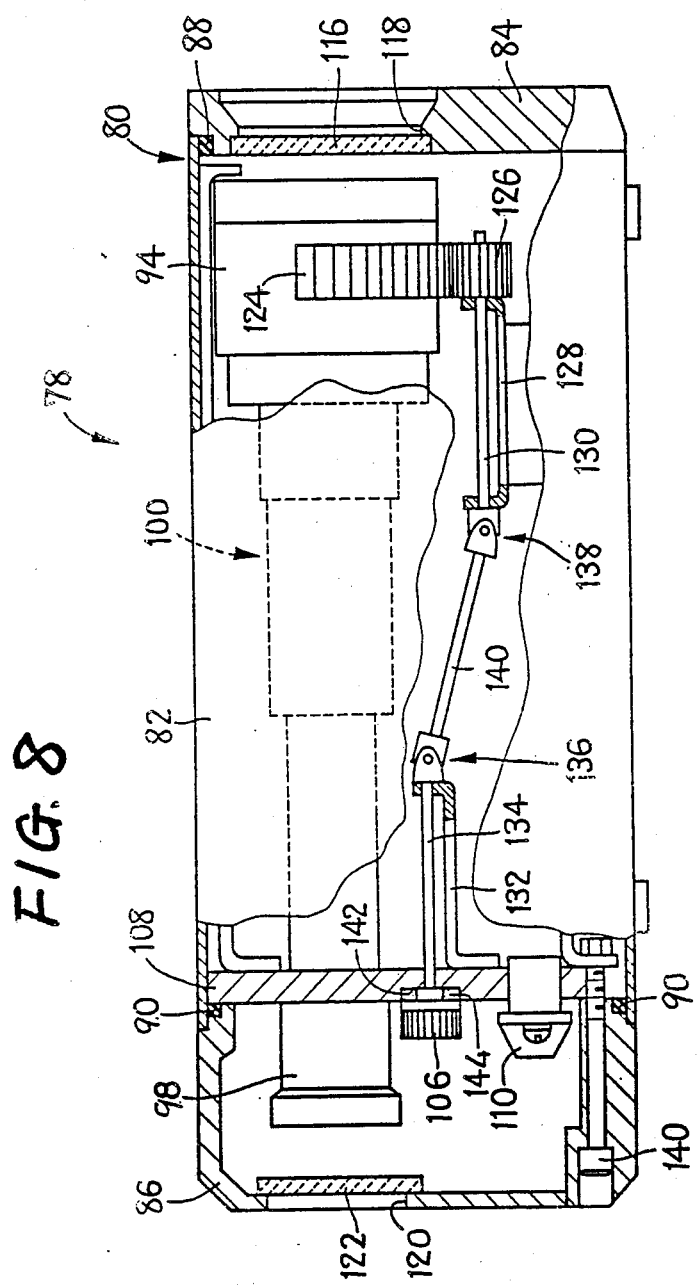

METHOD OF MEASURING TEMPERATURES AND PORTABLE RECORDER FOR STORING TEMPERATURE DATA

BACKGROUND OF THE INVENTION

The present invention relates to a method and a device for measuring temperatures at one or plural locations, and for easy and reliable processing and/or storage of multiple sets of temperature data representative of the measured temperatures.

In many industries, there is a need of measuring temperatures at one or more locations for utilization of the temperature data for various purposes. Usually, the obtained temperature data is processed and/or stored in a central data processing unit. To this end, a worker in a factory, for example, goes to a given measurement location on a periodic basis to obtain multiple measurements of temperature at that location. In another case, measurements are effected at many different locations within a big factory or plant, for example, to obtain temperature data of such different measurement locations. In either case, the measured temperatures and related data such as measurement location and time are manually recorded on a data sheet, and the data on the data sheet is entered into a central data processing unit such as a computer.

In the above arrangement, it is not necessary to connect peripheral temperature detectors at the measurement lcoations, to the central data processing unit with data transmission cables. On the other hand, however, the worker should spend a considerable time in recording the temperature data and other measurement data on a data sheet, and in loading the processing unit with the recorded data. More importantly, it is noted that there are possibilities that recording and data entry errors of the worker may occur in the process of recording measured temperatures on the data sheet at measurement locations, or in the subsequent process of entering the recordings of the individual locations into the data processing unit.

SUMMARY OF THE INVENTION

It is accordingly an object of the present invention to provide improved techniques which permit temperature data of a measurement location or locations to be stored or transferred into a data processing unit, without a manual data input or a on-line data transmission.

According to the present invention, there is provided a method for storage of temperature data of a single measurement location or of different measurement locations in a stationary data processing unit, comprising the steps of: measuring temperatures at the single measurement location at different points of time, or temperatures at the different measurement locations, by using a temperature detector or detectors; storing plural sets of temperature data representative of the measured temperatures in succession into memory means of a portable recorder; and transferring the plural sets of temperature data from the portable recorder directly into the stationary data processing unit, for automatic processing and/or recording of the temperature data by the data processing unit.

In the method of the invention described above, a set of temperature data obtained at each measurement location is temporarily stored in the portable recorder, and the stored sets of temperature data of the measurement locations are automatically transferred into the data processing unit for subsequent automatic processing and/or recording of the temperature data. Hence, the instant method eliminates the conventionally required proceses of manually recording temperature data on a data sheet at the same location or at different locations, and of subsequent input of the recorded temperature data into a data processing unit. Further, the method of the invention eliminates the conventionally encountered errors in the manual recording of temperatures and in the subsequent data entry into the processing unit. In addition, the instant method, eliminates the conventionally required data transmission network for connecting peripheral temperature detectors to the central data processing unit.

The above method of the invention may be suitably practiced by using a portable temperature data recorder which is provided according to the invention. This portable temperature data recorder comprises: connector means for temporarily connecting the temperature recorder selectively to a temperature detector at the single measurement location, or to temperature detectors at the different measurement locations, respectively; and memory means for storing in succession plural sets of temperature data representative of temperatures measured by the temperature detector or detectors, together with corresponding sets of measurement location data representative of the measurement locations, while the temperature recorder is connected to the temperature detector or detectors through the connector means. The plural sets of temperature data and the corresponding sets of measurement location data are transferred from the memory means directly into the data processing unit while the temperature recorder is connected to the data processing unit through the connector means.

According to another aspect of the invention, there is provided a portable temperature data recorder for storage of temperature data of a single measurement location or of different measurement locations in a stationary data processing unit, comprising: a portable housing which is carried to the measurement location or locations; temperature detector means, accommodated in the portable housing, for measuring temperatures at the measurement location at different points of time, or temperatures at the different measurement locations; memory means, accommodated in the portable housing and connected to the temperature detector means, for storing in succession plural sets of temperature data representative of temperatures measured by the temperature detector means, together with corresponding sets of measurement location data representative of the measurement locations; and connector means, accommodated in the portable housing, for connecting the temperature recorder to the data processing unit. The plural sets of temperature data and the corresponding sets of measurement location data are transferred from the memory means directly into the data processing unit while the temperature recorder is connected to the data processing unit through the connector means.

With the portable temperature data detector constructed as described above, the temperature data and other related data of the measurement location or locations may be stored in the memory means via the detector means, and automatically stored into the data processing unit by connecting the temperature recorder to the processing unit. Thus, neither manual recording of temperature data on a data sheet, nor manual entry of the temperature data into a data processor are required, and therefore errors in such manual data recording and/or entry are avoided.

According to a further aspect of the invention, there is provided a portable temperature data recorder for storage of temperature data of a single measurement location or of different measurement locations in a stationary data processing unit, comprising: temperature detector means for measuring temperatures at the single measurement location at different points of time, or temperatures at the different measurement locations; memory means for storing in succession plural sets of temperature data representative of temperatures measured by a temperature detector at the single measurement location at different points of time, or by temperature detectors at the different measurement locations; clock means for providing measurement time data representative of times at which the temperatures are measured; control means, connected to the memory means and the clock means, for storing plural sets of temperature data in the memory means, together with corresponding sets of measurement time data; and connector means for connecting the temperature recorder to the data processing unit, the plural sets of temperature data and the corresponding sets of measurement time data being transferred from the memory means directly into the data processing unit while the temperature recorder is connected to the data processing unit through the connector means.

In this arrangement of the portable temperature data detector, the temperature data obtained by the temperature detector or detectors is automatically stored in the memory means, and the stored temperature data is automatically transferred to the data processing unit, without manual data recording at the measurement locations, and without manual data input into the processing unit.

An additional advantage of the above recorder resides in that each set of temperature data is accompanied with measurement time data which indicates the moment at which the temperature data was obtained. Accordingly, the data processing unit may utilize the time data to show a variation in the temperature at a given measurement location in relation to different points in time of measurement, or indicate a time span during which an abnormal or unusual change in the temperature took place.

The temperature detector may be a radiation thermometer having an optical structure which receives heat rays radiated from an object, for measuring the temperature of the object. The radiation thermometer comprise a focus-adjusting device including a focus-adjusting rotary member for focusing the optical structure on the object by means of rotation thereof, a speed reducing device, and an operator-controlled rotary member connected to the focus-adjusting rotary member via the speed reducing device and manipulated to operate the focus-adjusting rotary member for focusing the optical structure.

In the case where the above-indicated speed reducing device is used, a resistance to rotation of the operator-controlled rotary member is imparted to the focus-adjusting rotary member, through the speed reducing device which amplifies the rotational resistance of the operator-controlled rotary member before it is imparted to the focus-adjusting rotary member. This arrangement protects the focus-adjusting rotary member from unfavourable rotation which would occur in high-temperature and high-vibration environments of the radiation thermometer, and which would cause the optical system of the thermometer to be out of focus.

The speed reducing device may comprise a first gear attached to the focus-adjustng rotary member and a second gear operatively connected to the operator-controlled rotary member. The first gear is disposed such that the first gear is co-axial with the focus-adjusting rotary member. The first gear has teeth which are formed along at least a portion of an outer circumference of the focus-adjusting rotary member. The second gear meshes with the first gear, and has a radius of arc smaller than that of the first gear. Preferably, the first gear is a worm wheel, and the second gear is a worm meshing with the worm wheel. In this case, the speed reduction ratio is very high, and the focus-adjusting rotary member is almost locked through engagement of the worm wheel with the worm, without providing the operator-controlled rotary member with any means for positively applying a rotational resistance.

The first and second gears indicated above may be replaced by a first and a second friction wheel. The first friction wheel is attached to the focus-adjusting rotary member so as to cover at least a portion of an outer circumference of the focus-adjusting rotary member. The second friction wheel having a smaller radius of arc than the first friction wheel is held in pressed rolling contact with the first friction wheel. Since this speed reducing device uses no gears, the device may be made simple and available at a reduced cost.

BRIEF DESCRIPTION OF THE DRAWINGS

The above and other objects, features and advantages of the present invention will be seen by reference to the following description of preferred embodiments of the invention, taken in connection with the accompanying drawings, in which:

FIG. 8 is a partially cutaway side elevational view of one embodiment of a radiation thermometer of the invention;

DETAILED DESCRIPTION OF THE PREFERRED EMBODIMENTS

Preferred embodiments of the present invention will be described in detail, by reference to the accompanying drawing.

Figure 1:
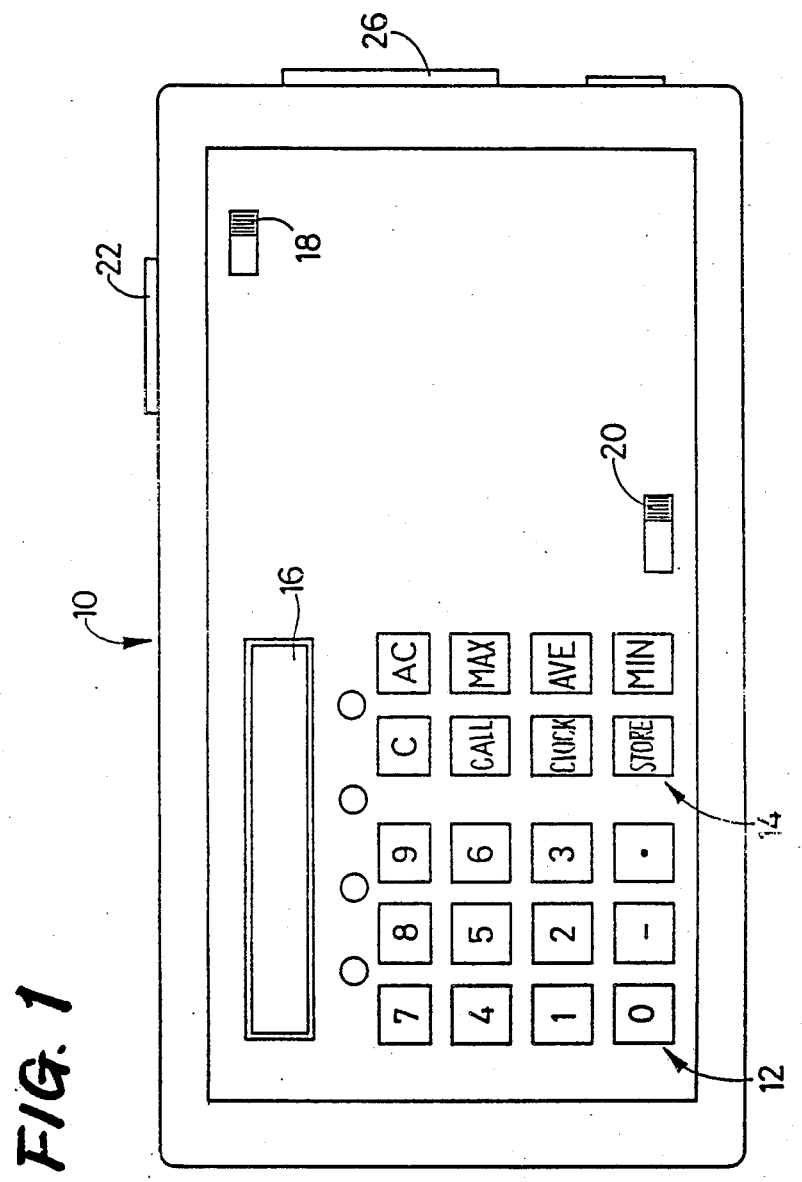
FIG. 1 is a plan view of one embodiment of a portable digital recorder of the invention.

Referring first to FIG. 1, there is shown a portable digital recorder 10 embodying the concept of the invention as a portable device for recording temperature data. On one surface of the box-like housing of the digital data recorder 10, an operator's control panel is provided, on which are disposed: numeric keys 12 (first group of input keys) corresponding to numerals [0] through [9]; function keys 14 (second group of input keys) which are assigned to serve different functions; a digital display 16 which provides digital indications of location and time of temperature measurement, and a value of the measurement; an input/output selector switch 18; and a power on/off switch 20. The power on/off switch 20 is set to its ON position to apply power to the digital data recorder 10. The input/output selector switch 18 is selectively set to its INPUT position to enable the digital data recorder 10 to receive input data, or to its OUTPUT position when the data stored in the digital data recorder 10 is fed as its output data to an external device.

Figure 2:
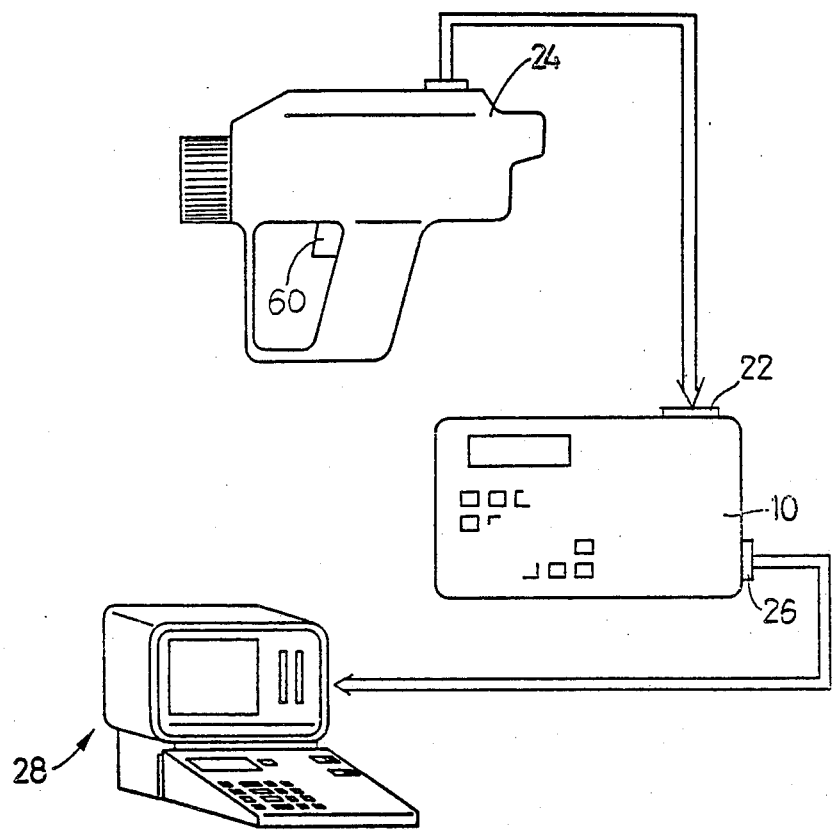
FIG. 2 is an illustrative view showing connections of the digital recorder of FIG. 1 to a thermometer and a computer.

Reference numeral 22 indicates a first connector for connecting the digital data recorder 10 to stationary temperature detectors at various locations of measurement, or to portable temperature detectors such as a radiation thermometer 24 as illustrated in FIG. 2. Reference numeral 26 designates a second connector for connection of the digital data recorder 10 to a stationary data processing device in the form of a computer 28. The portable digital recorder 10 is connected to the radiation thermometer 24 or other suitable temperature detector to record temperature data detected by the thermometer or detector, together with other data associated with the temperature measurement. The digital data recorder 10 is connected to the computer 28 to automatically load the computer 28 with the temperature and other data which are stored in the recorder 10.

Figure 3:
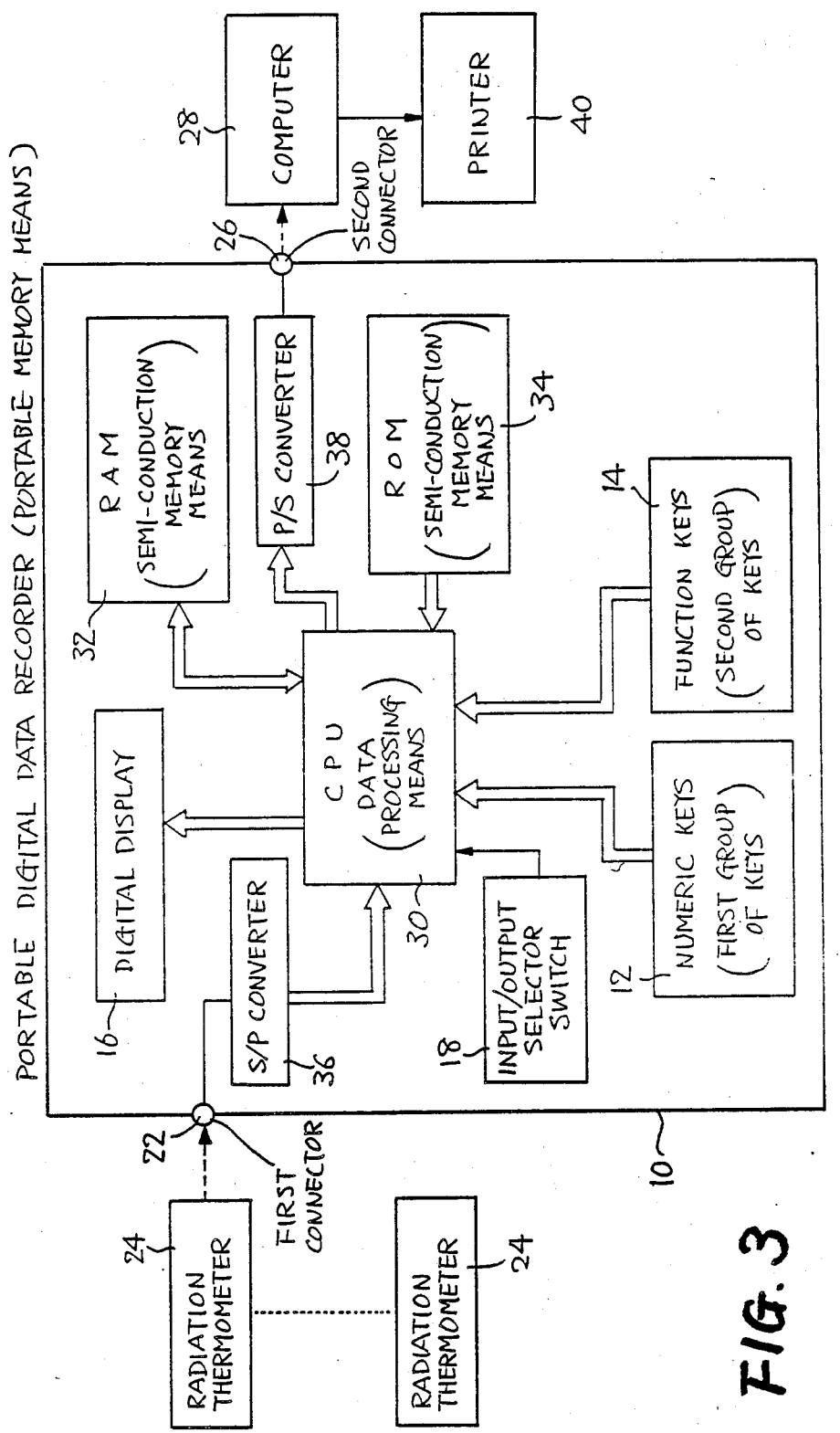
FIG. 3 is a block diagram showing an electrical circuit arrangement of the digital recorder.

As illustrated in FIG. 3, the digital data recorder 10 comprises data processing means in the form of a CPU 30, and semi-conductor memory means in the form of a RAM 32 and a ROM 34. The CPU 30 executes programs stored in the ROM 34, in response to signals from the numeric and function keys 12, 14, in order to store in the RAM 32 the temperature data from the radiation thermometer 24, together with measurement location data and measurement time data which are fed from the radiation thermometer 24 or entered through the numeric keys 12. Further, the CPU 30 serves to retrieve the temperature and associated data from the RAM 32 and display the retrieved data on the digital display 16, or to erase the stored data in the RAM 32, according to the command signals from the numeric and function keys 14. Described in more detail, the function keys 14 include a CALL key and a "C" key. The CALL key is used for retrieving from the RAM 32 the set of data of a desired measurement location by designating the location with the corresponding coded number through the numeric keys 12. The "C" key is operated to erase or delete the data when it is found unnecessary for some reason or other. Thus, the portable digital data recorder 10 has capabilities to search and erase the stored data.

The function keys 14 further include a CLOCK key and a STORE key. When the CLOCK key is operated, the time currently obtained by a clock circuit (not shown) incorporated in the digital data recorder 10 is displayed on the display 16. The time displayed is stored in the RAM 32 by depressing the STORE key. As soon as the STORE key has been depressed, the temperature measured by the radiation thermometer 24 is displayed on the display 16. By depressing the STORE key again, the data of the temperature displayed is stored in the RAM 32.

With the input/output selector switch 18 set in the OUTPUT position, the temperature data, time data and measurement location data which have been stored in the RAM 32 are transmitted to the computer 28 provided at a suitable location. An S/P converter 36 is connected between the radiation thermometers 24 and the CPU 30, for converting series signals into parallel signals, while a P/S converter 38 is connected between the CPU 30 and the computer 28, for converting parallel signals into series signals. These S/P and P/S converters 36, 38 contribute to reduced numbers of conductors of signal transfer cables between the radiation thermometers 24 and the digital recorder 10, and between the recorder 10 and the computer 28.

There will be described a manner in which the thus constructed portable digital recorder 10 is operated to effect measurements of temperatures.

A user of the digital recorder 10 brings the recorder 10 to plural temperature measurement locations at which the radiation thermometers 24 are installed. At each measurement location, the digital data recorder 10 is connected at its first connector 22 to the radiation thermometer 24. The temperature measurement taken on the radiation thermometer 24 is displayed on the digital display 16. More precisely described, the data indicative of the measurement location is entered by operating the numeric keys 12, and stored in the RAM 32 by depressing the STORE key. Upon the depression of the STORE key, the CPU 30 causes the digital display 16 to display the temperature currently detected by the radiation thermometer 24. The temperature data on the display 16 is stored in the RAM 32 by depressing the STORE key again. The time of measurement is indicated on the display 16 by depressing the CLOCK key, and stored in the RAM 32 by depressing the STORE key. The above steps of operations are taken at the other measurement locations, whereby the measurement location data, temperature data and time data of the individual measurement locations are stored in succession in the RAM 32.

After the measurements at the measurement locations are completed, the user connects the digital data recorder 10 to the computer 28 via the second connector 26, and sets the input/output selector switch 18 to its OUTPUT position. Thus, the temperature and associated data stored in the RAM 32 are automatically transferred to the computer 28. The computer 28 then operates, according to a predetermined program, to process the sets of data of the individual measurement locations and store the processed data. For example, the computer 28 obtains a change in the temperature measurements at each measurement location, and causes a printer 40 to provide a printout which shows the temperature change. If necessary, the highest and lowest temperatures, and/or the average temperature of each location, may be indicated on the printout, together with the representation showing the temperature change. The printout may contain a list of the past measurement values, or a graph showing the variation of those values.

In the instant embodiment of the invention, there is no need of reading and recording a temperature at each measurement location, and of entering the temperature measurements into the computer 28. Accordingly, the procedure for measuring the temperatures at the different locations, and for loading the computer with the measurement data, is simplified to a considerable extent. As a result, possibilities of errors in temperature reading and recording and in data entry into the computer may be minimized, whereby the reliability of the processed and stored data is accordingly improved.

In the case where the radiation thermometer 24 is portable, and is equipped with a pushbutton identical in function to the STORE key of the digital data recorder 10, it is possible to use this pushbutton on the thermometer 24 in place of the STORE key on the recorder 10 when a temperature measurement by the thermometer 24 is stored into the recorder 10.

Another embodiment of a device usable according to the invention will be described. In the interest of brevity and simplification, the following description and figures of the drawing referred to therein use the same reference numerals as used in the foregoing description and figures, to identify the corresponding elements, and their description will not be repeated.

Figure 4:
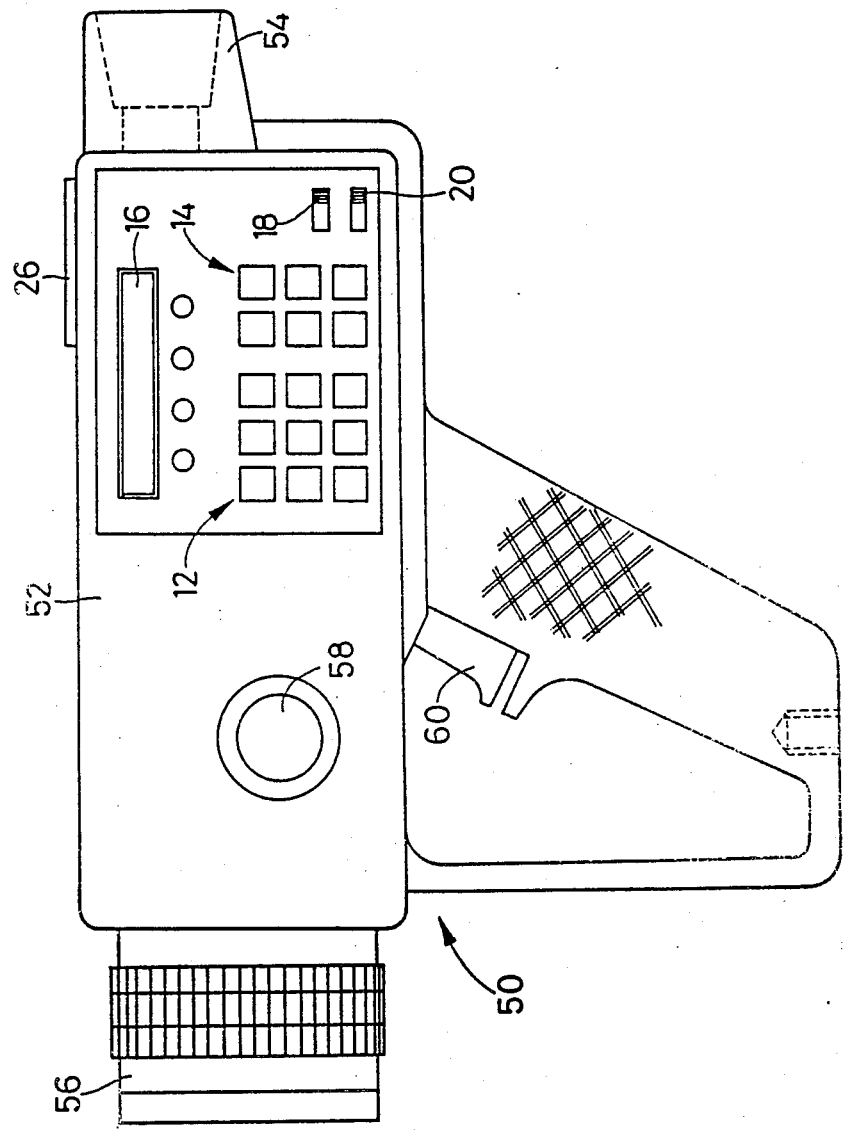
FIG. 4 is an elevational view of another embodiment of the invention.

While the portable digital data recorder 10 used in the preceding embodiment is connected to the plural radiation thermometers 24 installed at the measurement locations, it is possible to use a portable radiation thermometer 50 as illustrated in FIG. 4. This radiation thermometer 50 has a view finder 54 and an object lens tube 56 which extend in opposite directions from opposite ends of a body 52. In measuring a temperature of an object, the radiation thermometer 50 is oriented by the user while viewing the object through the view finder 54, so that an optical axis of the object lens tube 56 points to the object. The focus of the optical system is adjusted with the focusing dial 58, and a temperature of the object is measured by activating the trigger switch 60. The portable radiation thermometer 50 incorporates electrical circuits similar in function to those of the portable digital data recorder 10 of FIGS. 1-3. On a side surface of the body 52, there are disposed numeric keys 12 (first group of input keys), function keys 14 (second group of input keys), a display 16, an input/output selector switch 18 and a power on/off switch 20, which are similar to those provided on the digital data recorder 10 of the preceding embodiment. As indicated above, the portable radiation thermometer 50 serves not only as a temperature detector but also as a portable temperature recorder.

The measurements of temperatures by the instant portable radiation thermometer 50 at the individual measurement locations may be made in substantially the same manner, and with substantially the same result, as in the preceding embodiment. In this embodiment wherein a stationary radiation thermometer is not required at each measurement location, it is possible to make a measurement even at a location of an extremely high temperature where a radiation thermometer can not be installed permanently due to exposure to heat. Thus, the use of the portable radiation thermometer 50 permits easy and economical measurement and recording of temperatures at desired locations.

It will be obvious that the radiation thermometer 50 may be an assembly of a temperature detector and a recorder which are separable from each other, or a combination of the detector and the recorder which can be electrically connected with each other as with a cable.

While the radiation thermometer 24 or the portable radiation thermometer 50 is used in the preceding embodiment, these thermometers may be replaced by a thermocouple thermometer, a resistance thermometer, or other types of thermometer.

Although the temperature measured by the radiation thermometer 24 of the first embodiment is automatically stored into the RAM 32 of the digital data recorder 10 by connecting the recorder 10 to the thermometer 24 via the first connector 22, it is possible that the user of the recorder 10 reads the temperature on the radiation thermometer 24 and manually enters the reading into the recorder 10 by operating the numeric keys 12. In this instance, too, the measurement data recorded in the recorder 10 is automatically transferred from the RAM 32 into the computer 28 when the measurement data is processed and stored in the computer 28.

While the digital data recorder 10 or radiation thermometer 50 employs the RAM 32 for storing the measurement data, it is possible to replace the RAM 32 with other types of memory means such as a magnetic memory and a bubble memory.

Figure 5:
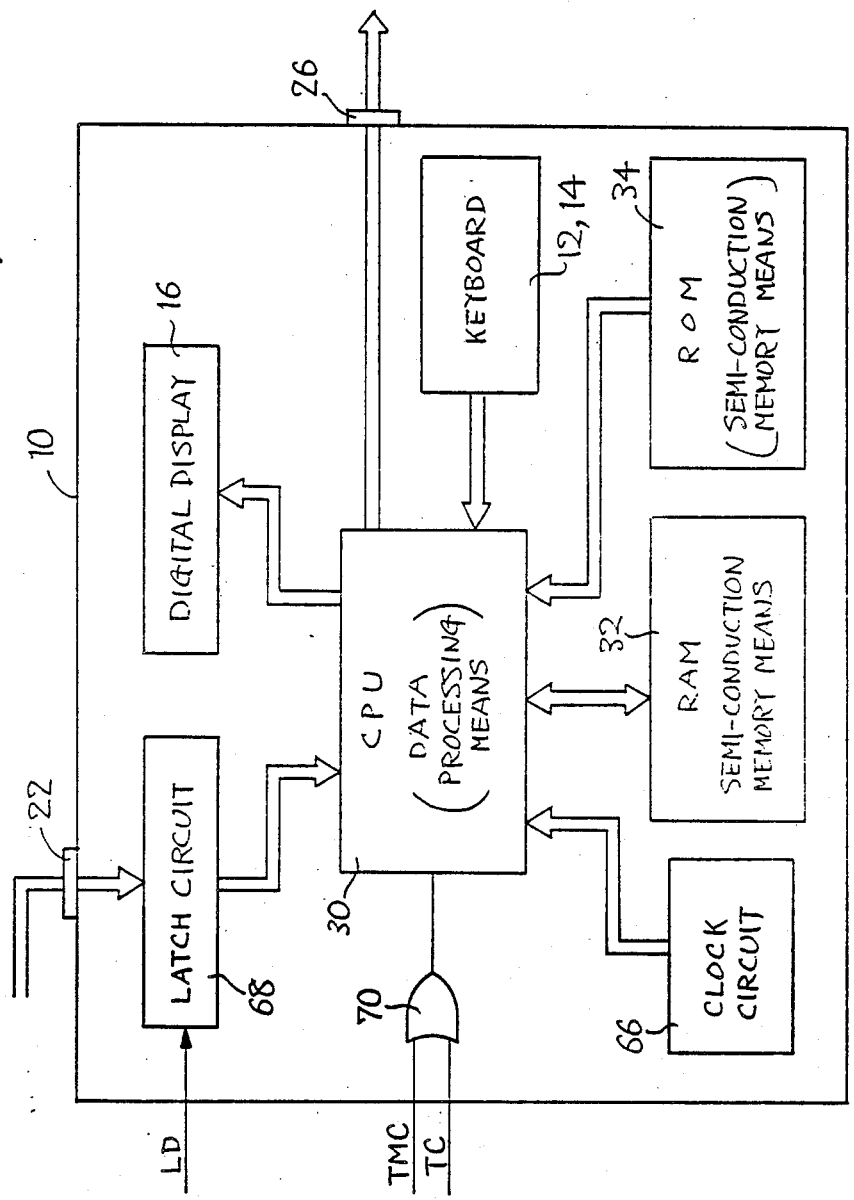
FIG. 5 is a block diagram showing an electrical circuit arrangement of a further embodiment of the invention.

Referring next to FIG. 5, there is shown another form of a digital recorder 10, which is used in place of the digital data recorder 10 of FIGS. 1-3. This digital data recorder 10 of FIG. 5 is substantially identical to the digital recorder 10 of FIGS. 1-3, with the exception that a latch circuit 68 and an OR gate 70 are provided while S/P and P/S converters are not used. A clock circuit 66 is used to provide measurement time data, as in the digital data recorder 10 of FIGS. 1-3 (clock circuit not shown in FIG. 3). The latch circuit 68 latches the temperature data, and transfers the latched data into the CPU 30 according to a LOAD signal LD from the radiation thermometer 24. The CPU 30 receives, through the OR gate 70, a MEASUREMENT COMMAND signal TMC generated from the thermometer 24 upon activation of a trigger switch 60 of the thermometer 24, and a MEASUREMENT COMMAND signal TC from other types of thermometers. In response to one of these MEASUREMENT COMMAND signals TMC and TC, the CPU 30 operates to store the temperature data in the RAM 32, together with measurement time data, measurement number data and measurement location data.

With the input/output selector switch 18 moved to its output position while the second connector 26 is connected to the computer 28, the measurement data stored in the RAM 32 is automatically transferred to the computer 28 as previously described.

Figure 6:
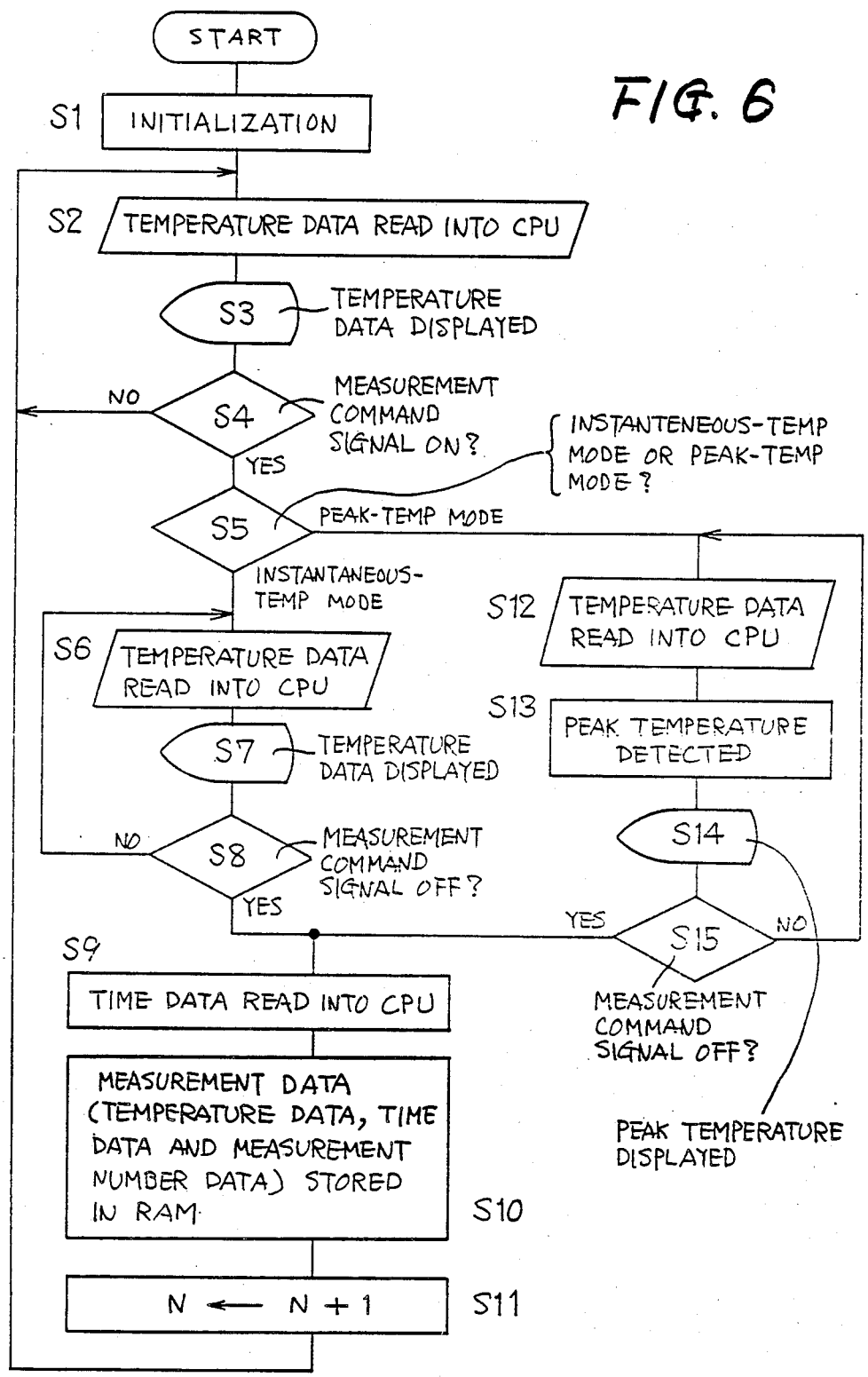
FIG. 6 is a flow chart illustrating the operation of the embodiment of FIG. 5.

Referring to a flow chart of FIG. 6, there will be described the data recording procedure of the digital recorder 10 with its input/output selector switch 18 placed in the INPUT position.

Initially, the CPU 30 executes step S1 for initialization, wherein a numerical value [1], for example, is set in a register N which stores data representative of a serial number indicating the measurement location or the order in which the measurements are made. This initially set value, which is entered through the numeric keys 12, represents the first measurement number. The initialization step S1 is followed by step S2 in which the temperature data from the radiation thermometer 24 is transferred to the CPU 30 via the latch circuit 68. Then, step S3 is executed to display the temperature data on the display 16. Step S3 is followed by step S4 to check if the MEASUREMENT COMMAND signal TMC or TC is present or not. If the signal TMC or TC is not present, the CPU 30 executes steps S2-S4 repeatedly. If the checking in step S4 reveals that the MEASUREMENT COMMAND signal TMC or TC is present, the CPU 30 goes to step S5 to check if the CPU 30 is placed in an instantaneous-temperature measurement mode or in a peak-temperature measurement mode. This mode of measurement is selected by an external selector switch not shown. In the instantaneous-temperature measurement mode, step S5 is followed by step S6 wherein the temperature data currently fed from the radiation thermometer 24 is read into the CPU 30, and then by step S7 wherein a temperature represented by the temperature data in the CPU 30 is indicated on the digital display 16. Then, the CPU goes to step S8 to check if the MEASUREMENT COMMAND signal TMC or TC has become absent or not. If the signal TMC or TC still remains, steps S6-S8 are repeatedly executed, and the instantaneous or current temperatures are displayed in step S7. When the signal TMC or TC has become absent, step S8 is followed by step S9 wherein the time data representative of the date and time of measurement from the clock circuit 66 is read into the CPU 30. Subsequently, the CPU 30 executes step S10 to store, at predetermined addresses of the RAM 32, the temperature data at the very moment when the signal TMC or TC has become absent, together with the time data and the measurement number data stored in the register N in the initialization step S1. Successively, the content of the register N is incremented in step S11, and thus the measurement number is updated.

Figure 7:
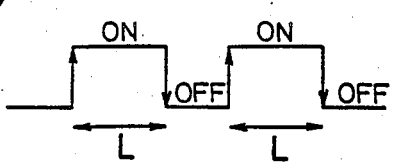
FIG. 7 is a view indicating a timing of temperature measurement in relation to a temperature measurement command signal, in the embodiment of FIG. 5.

In the case where the checking in step S5 indicates that the peak-temperature measurement mode is established, the CPU 30 goes to step S12 to read the temperature data from the radiation thermometer 24, and then goes to step S13 to hold the highest temperature after the MEASUREMENT COMMAND signal TMC or TC has become ON. Then, step S14 is executed to display the highest temperature on the display 16. Step S14 is followed by step S15 to check if the signal TMC or TC has become OFF. As long as the signal TMC or TC remains ON, steps S12-S15 are repeatedly executed. If the signal TMC or TC is found absent in step S15, the CPU 30 goes to the previously described step S9. Stated more specifically referring to FIG. 7, the display 16 indicates in step S14 the highest level of temperature detected during a time span L in which the MEASUREMENT COMMAND signal TMC or TC is ON. In step S10 following step S9, the temperature data representative of the highest or peak temperature during the time span L is stored in the RAM 32, together with the time data, and the measurement number data (stored in the register N).

As described above, the sets of temperature data are stored together with the corresponding sets of time data indicative of year, month, day and time, and the corresponding sets of measurement number data indicative of the numbers to identify the measurements. With these measurement data transferred to the computer 28 for processing thereof, it is possible to obtain accurate and reliable information on timewise changes or variations in temperature at the individual measurement locations, which information also indicates the location and time at which the temperature was abnormally changed.

Since the measurement data is automatically stored into the portable digital data recorder 10 and the stored measurement data is automatically transferred to the computer 28, conventionally experienced errors in reading thermometers and recording temperatures on a data sheet and in entering the temperature data into a computer are completely avoided, and such manual procedures are eliminated.

While the temperature data is stored together with the time data in the above embodiment, it is possible that the temperature data be processed within the digital data recorder 10 to obtain highest and lowest, and average levels so that these highest, lowest and average levels are stored together with the corresponding time data. Further, the temperature data received by the digital data recorder 10 may be compared with a predetermined level or levels such as an upper or lower limit, or both, so that the data representing the temperature levels beyond the limit or limits are indicated together with the time data indicative of the times at which such abnormal levels were established.

Although the mode of measurement (instantaneous-temperature measurement mode or peak-temeprature measurement mode) is selected by an external selector switch, the portable digital data recorder 10 itself incorporates a selector to select the mode of measurement.

Figure 9:
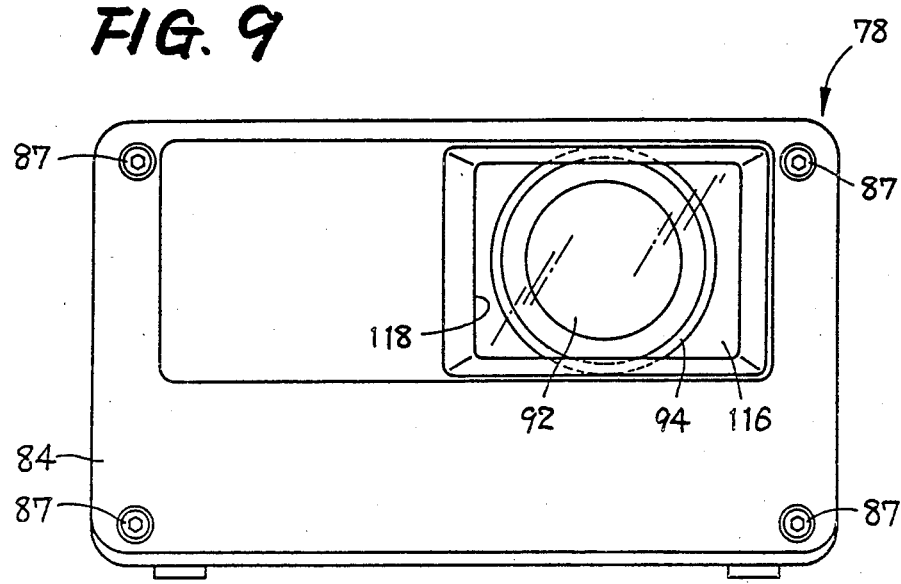
FIG. 9 is a front elevational view of the radiation thermometer of FIG. 8.
Figure 10:
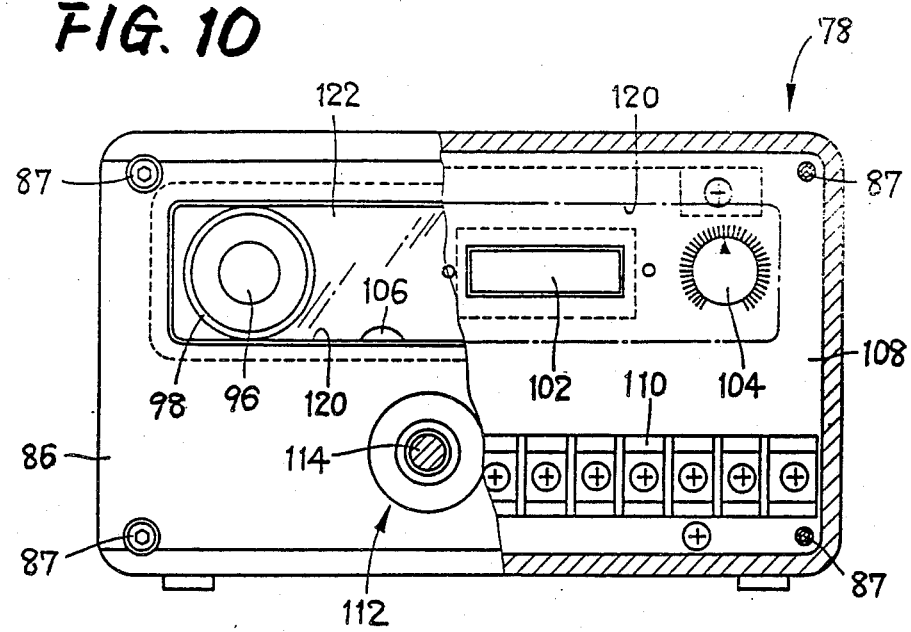
FIG. 10 is a partially cutaway rear elevational view of the thermometer of FIG. 8.

Reference is now made to elevational views of FIGS. 8-10, wherein an example of a radiation thermometer of stationary type is indicated generally at 78. This stationary radiation thermometer 78 has a housing 80 which includes a housing body 82 rectangular in transverse cross section, and a front and a rear end plate 84, 86 for air-tight closure of opposite open ends of the body 82. The front and rear end plates 84, 86 engage the inner surface of the housing body 82 at the opposite open ends, via respective sealing members 88, 90 interposed between the plate 84, 86 and the body 82. The end plates 84, 86 are secured to the body 82 with screws 87, whereby an enclosed space is formed within the housing 80. The housing 80 accommodates an optical structure 100, and a measuring circuit (not shown) including a temperature display 102, and an emissivity-adjusting knob 104. The optical structure 100 includes an object lens 92, a tube 94 accommodating the object lens 92, an ocular 96, and a tube 98 accommodating the ocular 96. A panel 108 is disposed at the rear end of the housing body 82, in engagement with the inner surface of the body 82, so that the space within the housing 80 is divided by the panel 108. The panel 108 supports the object lens tube 98, a focusing knob 106, the temperature display 102, the emissivity-adjusting knob 104, and other elements. The optical system is focused on an object by turning the focusing knob 106, and adjusted in emissivity by turning the knob 104 depending upon the kind of the object. In this condition, the temperature of the object is accurately measured by the measuriang circuit, and displayed in a digital form on the display 102. The panel 108 has plural electric terminals 110 including a power input terminal and signal-output terminals. These terminals 110 are connected to an external power source, a printer, recorder, and other external devices, through a connector 112 attached to the rear end plate 86, and a cable 114.

In the stationary radiation thermometer 78, the focusing knob 106 and the emissivity-adjusting knob 104 are initially set depending upon a distance to the object and the kind of the object. If the distance between the thermometer 78 and the object is fixed and the object is of the same kind, these knobs 104 and 106 are not so frequently manipulated. However it is required to periodically check for correct settings of the knobs 104, 106, in order to assure that the optical structure 100 correctly receives heat rays emitted from the object, and to assure that the optical system is exactly focused on the object. Otherwise, the measuring accuracy of the radiation thermometer 78 would be adversely affected. For this purpose, the front end plate 84 has a window 118 substantially in alignment with the object lens 92. The window 118 is provided with a glass plate 116 which permits the heat rays to pass therethrough. Similarly, the rear end plate 86 has a window 120 which is aligned with the ocular 96 and provided with a glass plate 122. This arrangement allows the user to readily check the optical structure 100 for correct orientation and exact focusing thereof with respect to the object, even with the optical structure 100 accommodated in the enclosed housing 80. The window 120 and the associated glass plate 122 in the rear end plate 86 are sized so that the temperature display 102, emissivity-adjusting knob 104 and focusing knob 106 may be easily seen through the window 120 (glass plate 122), without having to remove the rear end plate 86.

The object lens tube 94 of the optical structure 100 of the instant embodiment serves a rotary member for focusing the optical system. The tube 94 is adapted to be moved along the axis in very fine increments, by means of a cam and a slant cam groove (not shown). The object lens tube 94 is provided, at its outer circumferential surface, with a first gear in the form of an arcuate partial spur gear 124 of a relatively large diameter (radius of arc). The spur gear 124 is fixed to the tube 94 with screws (not shown), so that it engages a second gear in the form of a pinion 126 of a relatively small diameter. The pinion 126 is operatively connected to the focusing knob 106. More specifically, the pinion 126 is fixed to one end of a shaft 130 which is supported by a bracket 128 rotatably about an axis parallel to the axis of rotation of the object lens tube 94. In the meantime, the focusing knob 106 is fixed to one end of a shaft 134 which is rotatably supported by a bracket 132. The shafts 130 and 134 are connected at their other ends to opposite ends of a connecting rod 140 through universal joints 136, 138, respectively, whereby rotary movements of the focusing knob 106 are transmitted to the pinion 126. The panel 108 has a hole through which the shaft 134 extends. This hole terminates in a concentric recess 142 opposite to the focusing knob 106. The recess 142 accommodates a felt 144 such that the felt 144 is sandwiched between and in pressed contact with the panel 108 and the focusing knob 106, so as to give a resistance to rotation of the focusing knob 106.

When the focusing knob 106 is turned, its rotary motion is imparted to the object lens tube 94 via the pinion 126, whereby the tube 94 is adjusted in the direction of the optical axis. Since the spur gear 124 is larger in diameter than the pinion 126, the angle of rotation of the tube 94 is smaller than that of the focusing knob 106. Further, a resistance to rotation of the linkage between the focusing knob 106 and the pinion 126 is exerted on the tube 94 with a comparatively large gear ratio. Hence, the tube 94 is protected from unfavourable rotation upon vibration of the thermometer 78 even while the rotational resistance of the tube 94 itself is considerably reduced due to softening of a grease in the optical structure 100 at an elevated temperature, whereby otherwise possible deviation of the focal point of the optical system from the object due to rotation of the tube 94 is substantially eliminated.

In addition, the felt 144 disposed in the previously indicated recess 142 positively renders the focusing knob 106 a suitable resistance to its rotation. Thus, the felt 144 also contributes to the prevention of a rotational movement of the tube 94. In the instant radiation thermometer 78, the large-diameter spur gear 124 and the small-diameter pinion 126 constitute a speed reducing device (reduction gear).

Figure 11:
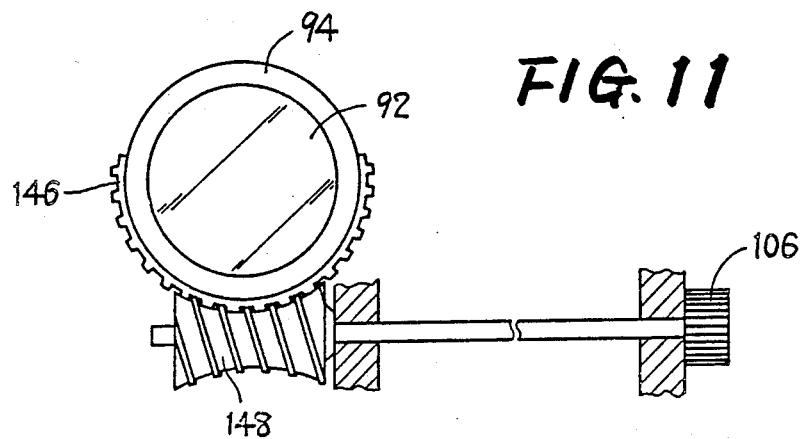
FIG. 11 is a fragmentary elevational view showing in enlargement another embodiment of the radiation thermometer.
Figure 12:
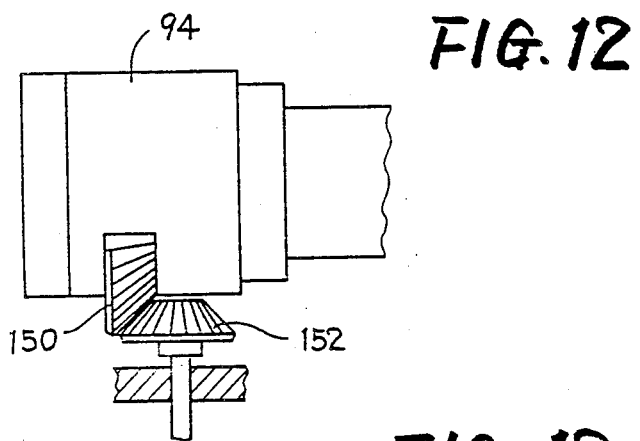
FIG. 12 is an enlarged fragmentary elevational view of a further embodiment of the radiation thermometer.
Figure 13:
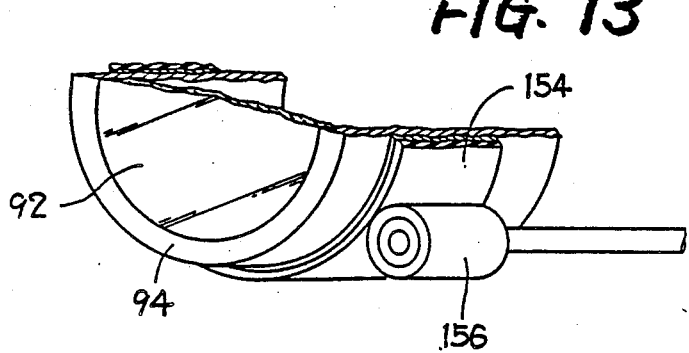
FIG. 13 is an enlarged fragmentary view in perspective of a still further embodiment of the radiation thermometer.

Referring to FIGS. 11–13, modified forms of a speed reducing device usable in the thermometer 78 will be described. In these figures, the same reference numerals as used in FIGS. 8–10 will be used to identify the corresponding elements, the description of which are omitted.

A speed reducing device shown in FIG. 11 consists of a partial worm wheel 146 as a first gear, and a worm 148 as a second gear meshing with the first gear. This speed reducing device has a considerably higher gear-reduction ratio, which gives greater assurance of preventing the optical structure 100 from losing its focus on the object.

Another type of speed reducing device of FIG. 12 consists of a first gear in the form of a partial bevel gear 150 of a relatively large diameter (radius of arc) fixed to the tube 94, and a second gear in the form of a bevel gear 152 of a relatively small diameter (radius of arc) which meshes with the bevel gear 150. The bevel gear 152 is operatively connected to the focusing knob 106. A speed reducing device of FIG. 13 is constituted by a large-diameter friction wheel 154 attached to the outer surface of the tube 94, and a small-diameter friction wheel 156 which is held in pressed rolling contact with the friction wheel 154 and operatively connected to the focusing knob 106. This speed reducing device does not use any gears having formed teeth, and is therefore advantageous for its structural simplicity and consequent reduction in cost of manufacture.

While the present invention has been described in its preferred embodiments with a certain degree of particularity, it is to be understood that the invention is not confined to the precise disclosure contained herein, but may be otherwise embodied with various changes, modifications and improvements, which may occur to those skilled in the art without departing from the spirit and scope of the invention defined in the appended claims.

For example, the speed reducing device disposed between the focusing knob 106 and the object lens tube 94 may be a combination of a first pulley, a second pulley having a smaller diameter than the first pully, and a belt connecting the first and second pulleys.

It is also possible that two speed reducing devices are used in a power transmission line between the focusing knob 106 and the ocular tube 98.

While the focusing movement of the tube 94 is effected by applying a rotational force to the focusing knob 106 in the illustrated embodiment, it is possible that the tube 94 be operated by applying a linear force to a lever which is operatively connected to the tube 94 via a suitable mechanical linkage.

What is claimed is:

1. A portable temperature data recorder for storing in a stationary data processing unit temperature data measured by a stationary temperature detector disposed at a measurement location, or by stationary temperature detectors disposed at different measurement locations, comprising:

first connector means coacting with said data processing unit for temporarily connecting the temperature data recorder selectively to said stationary temperature detector at said single measurement location, or to said stationary temperature detectors at said different measurement locations, respectively, and said connector means for connecting the temperature data recorder to said stationary data processing unit; and memory means in said data processing unit for storing in succession plural sets of temperature data representative of temperatures measured by said stationary temperature detector or detectors, together with corresponding sets of measurement location data representative of said measurement locations, while the temperature data recorder is connected to said stationary temperature detector or detectors through said connector means, said plural sets of temperature data and the corresponding sets of measurement location data being transferred from said memory means directly into said data processing unit while the temperature data recorder is connected to the data processing unit through said connector means.

2. A portable temperature data recorder according to claim 1, wherein said memory means comprises:

a semi-conductor memory element provided in a portable housing.

* * * * *

UNITED STATES PATENT AND TRADEMARK OFFICE
CERTIFICATE OF CORRECTION

PATENT NO. : 4,636,093
DATED : January 13, 1987
INVENTOR(S) : HIROYASU NAGASAKA, ET AL It is certified that error appears in the above-identified patent and that said Letters Patent is hereby corrected as shown below:

IN THE CLAIMS

Claim 1, line 13, change "said" to --second--;

line 15, delete "in said data processing unit".

Signed and Sealed this

Fifteenth Day of December, 1987

Attest:

DONALD J. QUIGG

*Attesting Officer*  *Commissioner of Patents and Trademarks*